United States Patent [19]

del Granado

[11] Patent Number: 4,658,779

[45] Date of Patent: Apr. 21, 1987

[54] INTERNAL COMBUSTION ENGINE OF THREE ROTATION PISTON

[76] Inventor: Juan del Granado, Casilla N° 4884, La Paz, Bolivia

[21] Appl. No.: 779,473

[22] Filed: Sep. 25, 1985

[30] Foreign Application Priority Data

Sep. 27, 1984 [BO] Bolivia ............................................ 166

[51] Int. Cl.⁴ ............................................ F02B 53/04
[52] U.S. Cl. .................................... 123/237; 123/214
[58] Field of Search .................. 123/214, 237, 248; 418/91, 101

[56] References Cited

U.S. PATENT DOCUMENTS 2,060,937 11/1936 Hinckley et al. ............... 123/237 X
3,176,664 4/1965 Kurose ............................. 123/237
4,102,615 7/1978 Irgens ............................. 418/101 X Primary Examiner—Stephen F. Husar
Attorney, Agent, or Firm—Kerkam, Stowell, Kondracki & Clarke

[57] ABSTRACT

The machine consists of 3 rotors which are attached to a common central shaft. The pistons move in a circular path within three separate chambers in three sections of the engine. The combustion of a combustible substance (gasoline) is carried out in two end sections through the action of a nozzle and a spark plug and the explosion of the gas, thus sets the rotors in motion. In a middle section the rotor sucks in air and compresses it towards the other two chambers.

3 Claims, 10 Drawing Figures

INTERNAL COMBUSTION ENGINE OF THREE ROTATION PISTON

BACKGROUND OF THE INVENTION

Engineers have tried for a number of years to procure a motor without parts having alternating movement such as pistons, connecting rods, valves, etc. Hydraulic and steam turbines were the solution when the energy used was flowing water or steam under pressure. The gas turbines, which use the expansive power of the burning liquid fuel, have solved the problem for airplanes, but not, feasibly, for automobiles, to date.

All the inventions on "rotary motors" failed when built, unitl 1959 when the German Company "N.S.U." (motorcycle and small car factory) announced that the motor conceived by Engineering Doctor Wankel had reached an experimental stage that assured an immediate solution of the final mechanical problems. The laboratories and workshops of the "N.S.U." have since worked under the direction of Doctor in Engineering Froeda, and the following important companies purchased patent rights to the "Wankel" engine.

Curtis Wright in the United States (for aviation engines); in German, Mercedes Benz (for cars), Fitchel-Sachs (for motorcycle engines), Mercedes Benz again, and the group formed by Krupp, and Glokner-Humbold Dutz, all for Diesel engines; and in Japan, Toyo-Kogyo (producer of Mazda). Besides, other important companies, like Perkins, Rolls Royce, Fiat, Renault, Citronen, and Volkswagen, were interested in the "Wankel" type engine one way or another.

Ihe idea of inventing a rotary engine emerged from me when scientists found that the oil reserves were being exhausted around the world and thus in the future years (after 1960) the prices would increase remarkably.

After studying the mechanism of all existing motors, I concluded that their mechanical system could be changed to the rotary piston type, thus doing away with the crankshaft and the connecting rods completely, hence reducing the number of moving parts. As a result, the motor is lighter and smaller and used less fuel; and its production is more economical.

SUMMARY OF THE INVENTION

A practical engine evolved which solved the air tightness problem through the use of semicircular-shaped valves, rotational piston-cams, two cycles, and three chambers with the corresponding rotary pistons. I have given this engine the name of Three Piston Rotary Motor (3.P.R.M).

BRIEF DESCRIPTION OF THE DRAWING

The invention will be more particularly described in reference to the following drawings.

DESCRIPTION OF THE PREFERRED EMBODIMENT

Figure 3:
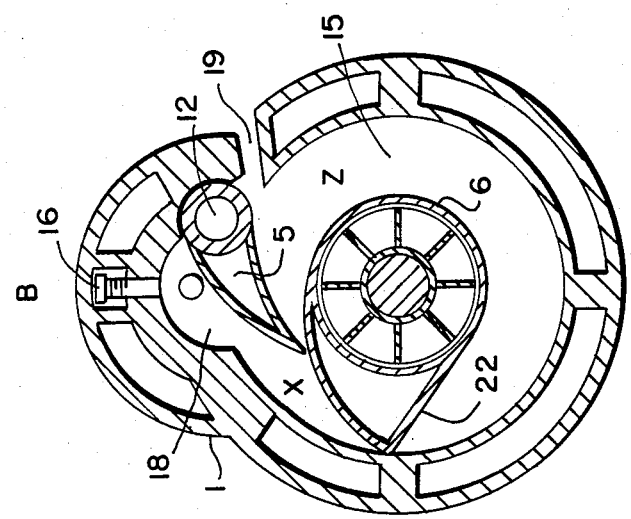
FIG. 3 is a sectional view through the compression and center chamber of the engine.
Figure 1:
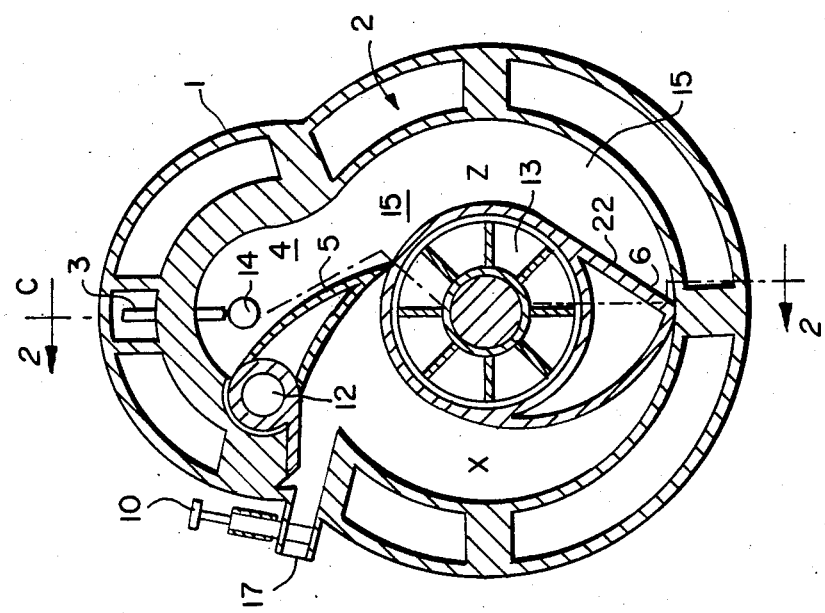
FIG. 1 is a section through one of the two power pistons.
Figure 2:
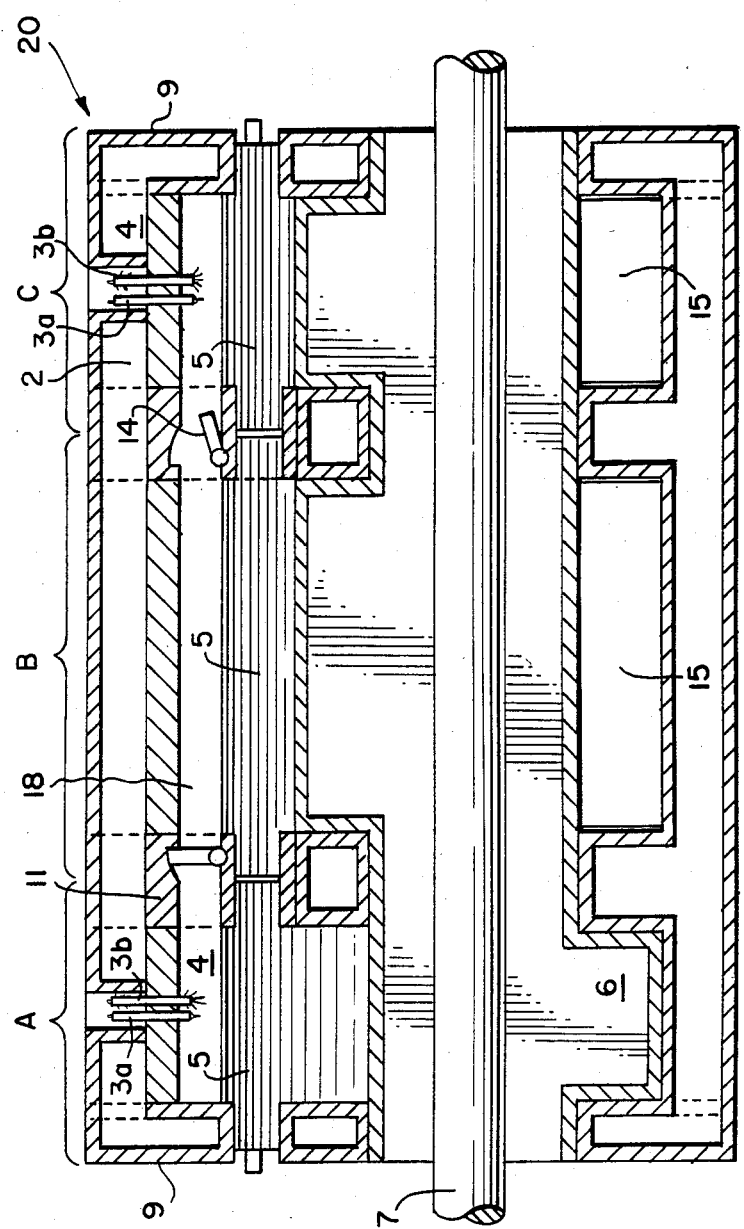
FIG. 2 is a section on line 2—2 of each of the three pistons of the engine.

Referring to the drawings of the engine, generally designated 20, has three sections designated A, B, and C with sections A and C comprising the combustion and exhaust chambers and section B the air compression chamber.

The separate parts of the engine are:
1. Stator or block;
2. Water jacket;
3A. Fuel injection nozzle;
3B. Spark plug;
4. Combustion chamber;
5. Semicircular valve;
6. Rotating piston (A.B.C.);
7. Central axle;
8. Longitudinal spokes;
9. End lids;
10. Brake;
11. Partition;
12. Air conduit semicircular valve;
13. Rotors' air conduits;
14. Air conduit;
15. Rotor chamber;
16. Safety valve;
17. Exhaust-gas outlet;
18. Air compression chamber;
19. Air admission conduit;
20. Engine; and
21. Rotor lobes.

The mechanism of the three piston rotary engine 20 consists of a fixed body or stator (block) which is hollow in part and is equivalent to the block of engines which feature crankshafts and it has a number 8 shape in tranverse cross-section. The interior of the block is divided into three sections (A,B,C), separated by the partitions (11) and bounded at the ends by lids or heads. Within each of these chambers, the movable parts of the motor are to be found. They are the rotors, (6) the semicircular valves (5), the main or central axle (7).

The stator (block), the partitions and the lateral heads are covered by a water-jacket (2), that cools the engine by means of a radiator not shown.

In sections (A and C), where the engine power is generated, are located the semicircular valves (5), the rotors (6), the gas outlet (17), the brake (10) which allows a faster ignition for the engine, and brake of motor.

In sections (A and C) are the combustion chambers (4) where the spark plugs (3B) are located as well as the fuel injection nozzles (3).

The semicircular valves divide chambers (A and C) into two parts, this occurs when the valves are supported by the rotors, so we have the combustion chambers (4), and the chamber where the rotors are located.

The inside of the hollow semicircular valves are cooled by air introduced through the quill shaft (5).

The rotors (6A) and (6C) rotate the central axle (7) such that when the lobe (22) of rotor (6A) is down, the lobe (22) of rotor (6C) is up or at top dead center.

The lobes (22) of the rotors (6) are triangle-shaped with a vertex slightly slanted against the movement direction and the curved sides are in contact with the chamber walls. The three rotors are hollow; so that air flows through the open spaces that lie between the main axle and the rotors by means of a fan, not shown in front of these open spaces.

Chamber (B) is at the center of the engine, and supplies compressed air to combustion chambers (A) and (B), and can even be larger than shown. Inside this chamber is located a semicircular valve (5B), which is similar to the valves in the lateral chambers, except that it opens in the opposite direction splitting the rotor chamber in two sections, one in which the air is sucked in from the admission conduit (19) and the other section where the piston compresses the air toward the compression chamber and from there onto the combustion chambers 4.

The three rotor engine offers more advantages than piston type internal combustion engines with crankshafts because it has fewer moving parts, it burns less fuel and the engine can run on any fuel such as gasoline, kerosene, alcohol, gas by merely regulating the fuel mixture.

The engine can be used in automobile vehicles, helicopters, airplanes, and as a stationary motor for a vast number of applications.

To operate the 3 P.R.M. engine, the main axle (7) should be rotated with a starting motor or starting crank until the engine is ignited.

Figure 4E:
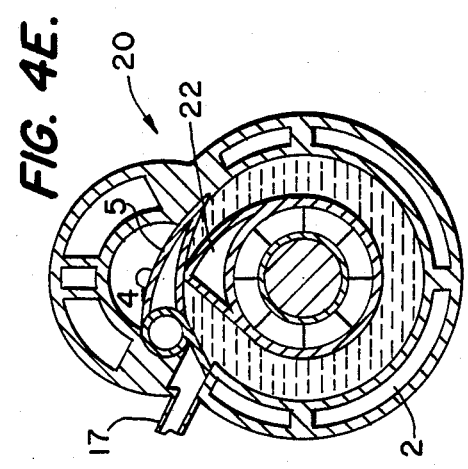
FIGS. 4E and 4F show the position of the rotor and chamber valve of the other end chamber corresponding to FIGS. 4A and 4B.
Figure 4F:
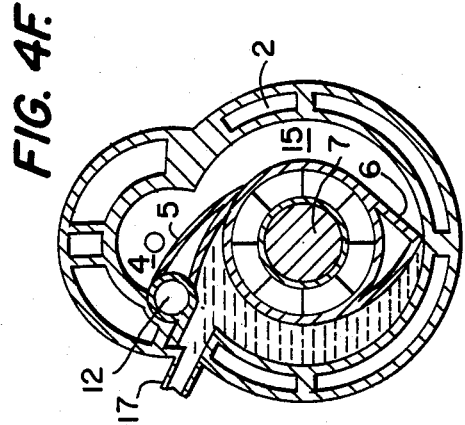
Figure 4C:
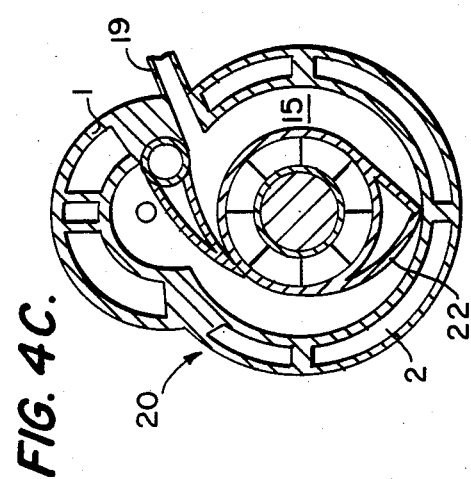
FIGS. 4C and 4D show the position of the rotor and chamber valve of the center chamber corresponding to FIGS. 4A and 4B.
Figure 4D:
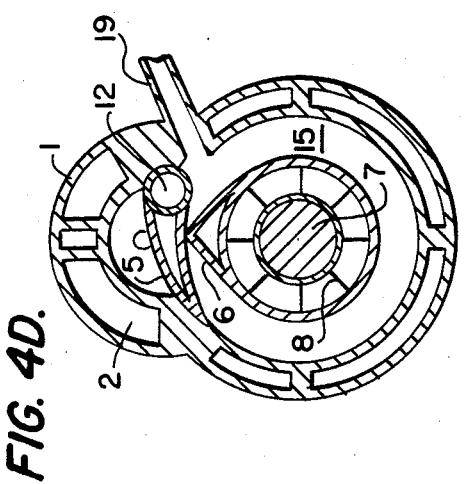
Figure 4A:
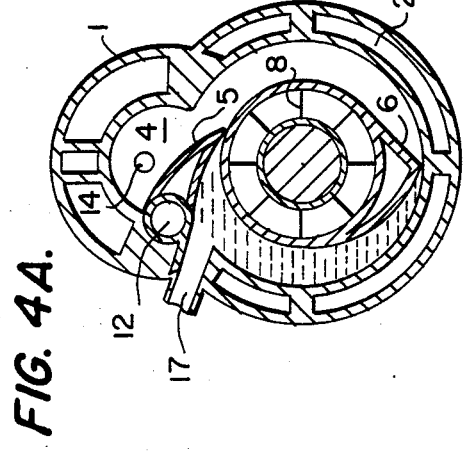
FIGS. 4A and 4B illustrate the position of the rotor and chamber valve of one end of the engine when the rotor lobe is at the bottom of the chamber and at the top of the chamber respectively.
Figure 4B:
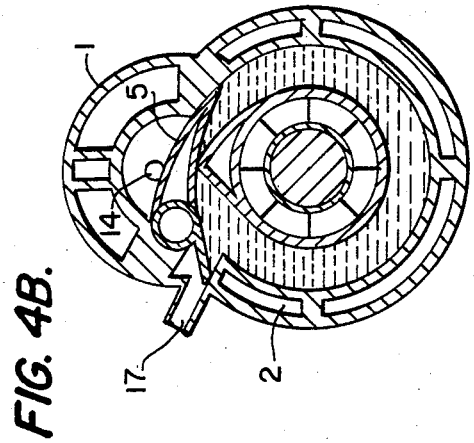
Figure 5:
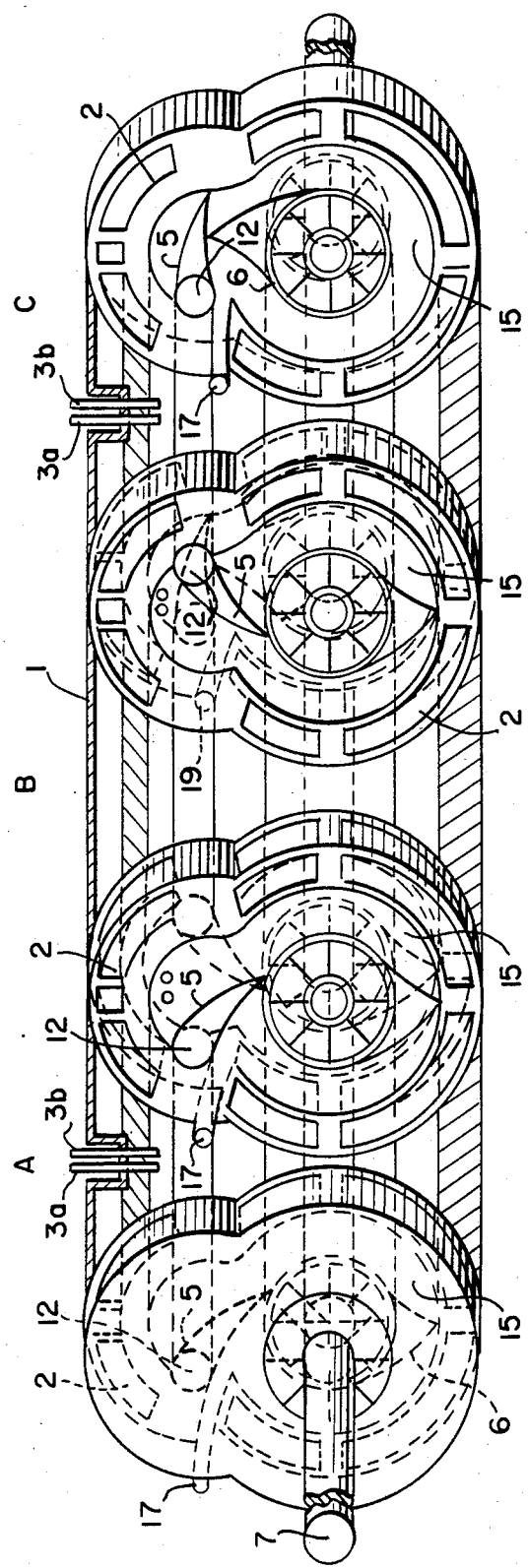
FIG. 5 is an exploded longitudinal perspective view.

Supposing that the motor is running and at the moment the semicircular valves and the rotors are revolving in their chambers, in the following positions illustrated in FIG. 4. The crest of rotor (6A) is downward, with the explosion gas making the rotor turn, section (Z), and expelling the exhaust at section (X). Then the piston lifts the semicircular valve closing the relief port.

The rotor of chamber (B), with its crest downward, will compress the air toward combustion chamber (A) via air conduit (14) sweeping the exhaust and filling the chamber with compressed air. At this time, the crest of rotor in section (C), is upward, and with the combustion chamber closed and full of exhaust from the previous explosion. At this exact moment, fuel is injected to the combustion chamber in section A, the spark plug ignites the fuel producing its explosion together with the compressed air, the rotor will now be located at the end of the semicircular valve. The valve now drops due to the pressure of gas making the rotor revolve around the chamber and expelling the exhaust through the outlet.

When it completes a turn of 360 degrees, the pistons have completed the four cycles of an explosion type gasoline engine.

The rotors in chambers (A) and (C) produce the power of the engine, revolving the main axle and at the same time, making the piston in chamber (B) revolve. This is the chamber that sucks in and compresses air toward combustion chambers (A) and (C), filling them with compressed air.

When the rotor in section (B) is at the top dead center, after having filled combustion chamber (A) with compressed air, the rotor then compressed the air toward combustion chamber (C), sweeping out the exhaust, and filling it with compressed air.

When the crest of rotor in section (C) is downward, with the combustion chamber open further rotation expells the exhaust gas through the outlet on side (X).

When the crest of the rotor in section (C) reaches the relief port, the piston lifts the semicircular valve which obstructs the outlet closing the combustion chamber airtight, after sweeping out the exhaust, and is now ready for fuel injection and ignition.

As it completes one turn of 360 degrees, the pistons have completed the four cycles of the gasoline engine cycle.

I claim:

1. A rotary internal combustion engine comprising a housing divided by partition means into three side by side chambers, each of said chambers having a FIG. 8 configuration in transverse section to thereby define a first and second zone, a shaft mounted for rotation concentrically through each first zone in said housing; three rotary pistons secured to said shaft; each of said pistons having a semi-circular extension having a flat surface adapted to engage the walls of each of the piston receiving first zone; a wedge shaped valve mounted between the first and second zones in each of the chambers, and adapted to be engaged by the rotary pistons and to be actuated by the piston extensions; air passages through each of the rotary pistons and through the valve for cooling the engine; means for directing fuel into two of the rotary chambers; means for igniting the fuel and exhaust passage means for exhausting burned fuel from said two of the rotary chambers, said two of the rotary chambers comprising end chamber and the remaining chamber comprising a compressor.

2. The rotary engine as defined in claim 1 wherein the semi-circular extension forms a protuberance on each of the rotary piston said protuberance having a curvilinear wall which curvilinear wall is equivalent to a curvilinear base of the wedge shaped valve.

3. The invention defined in claim 2 wherein the other face of the protuberance on each of the rotary pistons has a substantially rectilinear face.

* * * * *